UNITED STATES PATENT OFFICE.

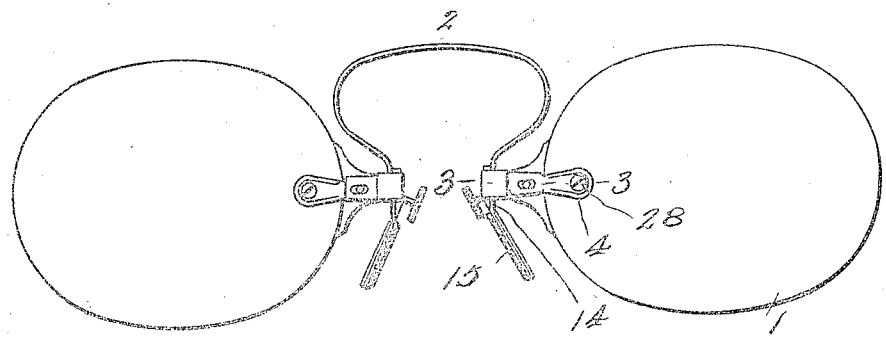

ERHARD J. STROHM, OF LIVINGSTON, MONTANA; EDITH W. STROHM, OF NEWTON TOWNSHIP, CALHOUN COUNTY, MICHIGAN, ADMINISTRATRIX OF SAID ERHARD J. STROHM, DECEASED.

EYEGLASSES.

959,815.

Specification of Letters Patent.

Patented May 31, 1910.

Application filed August 31, 1909. Serial No. 515,464.

*To all whom it may concern:*

Be it known that I, ERHARD J. STROHM, citizen of the United States, residing at Livingston, in the county of Park and State of Montana, have invented certain new and useful Improvements in Eyeglasses, of which the following is a specification.

My invention relates to improvements in eye-glasses or the like, and has especial reference to the means for securing the lenses to the bridge-spring of an eye-glass.

It is well known that the lens used for the correction of astigmatism of the eye is formed of a section of a cylinder, and that great care is taken to ascertain the exact major axis of the lens thus formed, so that the lenses may be so mounted upon the bridge-spring that the major axis thereof may have a requisite position in relation to said bridge-spring, it being understood that this relation is such that said major axis will assume a horizontal position when the bridge-spring is expanded by placing the same upon the nose of the wearer.

It is therefore the object of my invention to provide a connecting means for securing the lenses to the bridge-spring of an eye-glass, which will not work loose and which will retain the lenses in their requisite position in relation to the bridge-spring.

My invention consists generally of a lens-holding member, upon which is movably mounted a spring-pressed engaging member.

In the accompanying drawings forming a part of this specification, and in which like numerals are used to designate like parts, Figure 1 is a plan view of a pair of eye-glasses embodying my invention. Fig. 2 is a detail view of parts of Fig. 1 portions thereof being broken away. Fig. 3 is a vertical sectional view taken on the line 3—3 the lens being omitted, and Fig. 4 is an enlarged perspective view of the elements forming my improvement and showing members associated therewith.

In the accompanying drawings, in which the preferred embodiment of my invention is disclosed, 1 designates a lens and 2 the bow-spring to which the lens is attached in a manner hereinafter to be described. The lens holding member comprising a body portion 3 upon one side of which are arranged the similar spaced alined ears 4. Each of said ears 4 is provided with an aperture 5 near the outer end thereof, and with the longitudinally arranged slot 6, near the inner end thereof. Upon the other side of said body portion 3 are arranged spaced ears or sides 7, equidistantly between which is arranged the cylindrical lug 8 above and below which are arranged upon said body portion 3 the alined recesses 9. The bow-spring 2 is provided upon each end 10, with the aperture 11, above and below which are arranged the alined lugs 12 upon both sides of said bow-spring, as clearly shown in Fig. 2. The spring 14, upon the lower end of which is arranged the nose guard 15, is provided near its upper end with the aperture 16, above and below which are arranged the alined recesses 17. A cap 18 provided with the centrally arranged aperture 19 and the bent portion 20, is used for a purpose to be described.

The outwardly spreading lens-engaging member 21 has a curved bow-shaped outer edge 22, adapted for engagement with a lens, and has the oppositely arranged edge slotted as at 23, forming the centrally arranged horizontal tongue 24. The lens-engaging member 21 is provided with an aperture 25 which is centrally arranged thereon.

In assembling my device, a spring 26 is placed around the tongue 24 and the lens-engaging member 21 is arranged between the ears 4. A pin 27 is then rigidly secured within the aperture 25 upon the lens-engaging member and has its ends arranged within the slots 6. It will be obvious by referring especially to Fig. 3 that the lens-engaging member 21 is free to have relative longitudinal movement upon the lens-holding member, and that this movement is limited by the spring 26. A lens 1 is placed between the ears 4, to assume a position shown in Figs. 1 and 2, and a suitable bolt 28 is passed through the apertures 5 upon the ears 4 and through an aperture in the lens, and is held in place by a nut or any suitable means. When the lens 1 has been placed in the position shown in Figs. 1 and 2, it is obvious that the lens-engaging member 21 will be forced against said lens 1 and thus hold the same in its correct relative position therewith, owing to the tension of spring 26. The end 10 of the bow-spring 2 is arranged between the sides 7, the lug 8 passing through the aperture 11 and the lugs 12 upon the outer side of said bow-spring, fitting within the recesses 9 upon the body portion 3. The spring 14 upon which the nose guard is mounted, is then arranged between the sides 7, the lug 8 passing through the aperture 16 therein and the recesses 17 containing the lugs 12 arranged upon the inner side of said bow-spring 2. The cap 18 is arranged between the sides 7 and upon the spring 14, the lug 8 passing through the aperture 19 therein, and the bent portion 20 thereof fitting over the upper end of spring 14 and upon one of the lugs 12, as clearly shown in Fig. 2. A screw 29 as at 30 is screw-threaded into the lug 8, and holds the bow-spring 2, the spring 14 and the cap 18 in a locked engagement with each other, as clearly shown in Fig. 2.

Having fully described my invention, I claim:

1. The combination in eye glasses with the bow-spring and lens, of a lens-holding member in engagement therewith, comprising ears between which said lens is mounted, a member passing through said ears and lens, a lens-engaging member provided with a tongue and adapted to engage said lens slidably mounted between said ears for having relative longitudinal movement therewith, and a spring surrounding said tongue and abutting a portion of said lens-holding member, substantially as described.

2. The combination in eye glasses with the bow-spring and lens, of a lens-holding member in engagement therewith, comprising slotted ears between which said lens is mounted, a member passing through said ears and lens, a lens-engaging member arranged between said ears and adapted to have relative longitudinal movement therewith, a member passing through said lens-engaging member and adapted to operate within said slots, said lens-engaging member being provided with cut out portions and a tongue, a spring arranged around said tongue and within said cut out portions, and abutting a portion of said lens-holding member, substantially as described.

3. The combination in eye glasses with the bow-spring and lens, of a lens-holding member in engagement therewith, a lens-engaging member mounted upon said lens-holding member, and having relative longitudinal movement therewith, means for normally yieldingly holding said lens-engaging member in contact with said lens, said lens-holding member being provided with spaced sides between which is arranged a lug and recesses, said bow-spring being provided with an aperture adapted to contain said lug and having lugs adapted to fit within said recesses, a nose guard-carrying member arranged upon said bow-spring within said spaced sides, and having interlocking engagement therewith, and means for rigidly securing said lens-holding member, said bow-spring, and said nose guard-carrying member in engagement with each other, substantially as described.

4. The combination in eye glasses with the bow-spring and lens of a lens-holding member in engagement therewith, means for detachably securing said lens-holding member to said lens, a lens-engaging member movably mounted upon said lens-holding member, means for guiding said lens-engaging member during its movement, and a spring arranged upon said lens-holding member and in engagement with said lens-engaging member, substantially as described.

5. The combination in eye glasses with the bow-spring and lens, of a lens-holding member in engagement therewith, means for detachably securing said lens-holding member to a lens, a lens-engaging member mounted upon said lens-holding member for moving longitudinally thereof, and a spiral-spring arranged upon said lens-holding member and in engagement with said lens-engaging member, substantially as described.

In testimony whereof I affix my signature in presence of two witnesses.

ERHARD J. STROHM.

Witnesses:
W. E. BENNETT,
FRANK BENDER.